Sept. 2, 1941.  E. M. ASHWORTH ET AL  2,254,411
REVERSE POWER RELAY
Filed June 14, 1939  2 Sheets-Sheet 1
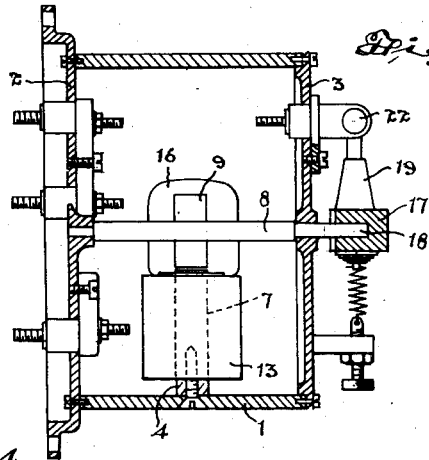
Fig. 1.
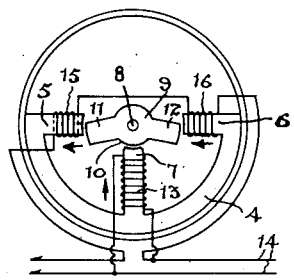
Fig. 3.
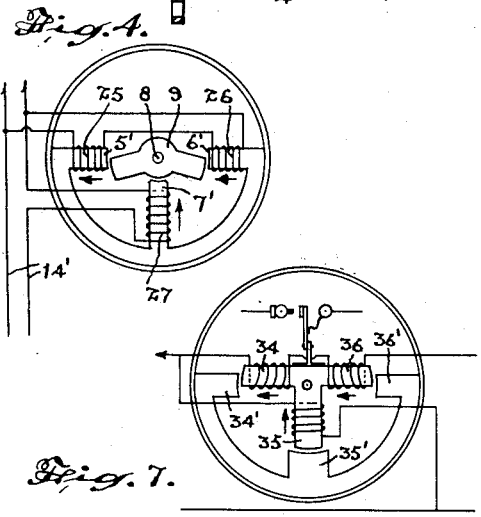
Fig. 4.
Fig. 7.
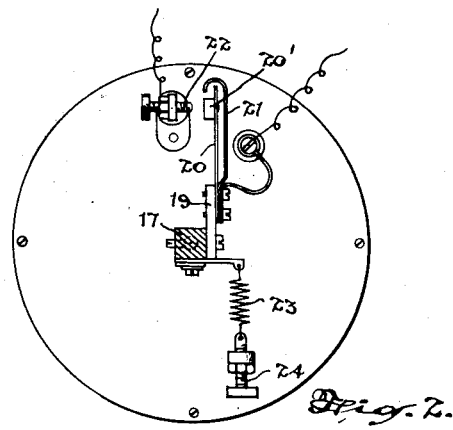
Fig. 2.
Fig. 6.
Inventors.
Edward M. Ashworth.
Frank F. Ambuhl.

Inventors.
Edward M. Ashworth.
Frank F. Ambuhl.

Patented Sept. 2, 1941

2,254,411

UNITED STATES PATENT OFFICE 2,254,411

REVERSE POWER RELAY

Edward M. Ashworth and Frank F. Ambuhl, Toronto, Ontario, Canada, assignors to Toronto Electric Commissioners, Toronto, Ontario, Canada Application June 14, 1939, Serial No. 279,071

5 Claims. (Cl. 175—294)

The principal objects of this invention are to provide a reverse power relay which will be instantaneously responsive to a reversal in the energizing current load even under exceptionally low voltage conditions, and to devise a construction which will be rugged and dependable in service and which may be manufactured at comparatively low cost.

A further and important object is to provide a reverse power relay which may be operated by either direct or alternating current, with a strong operating movement.

The principal features of the invention reside in the novel construction and manner of energizing an electro-magnetic relay device whereby a contact-operating armature is oscillatably controlled to move in either a clockwise or counter-clockwise direction by co-operation with a plurality of electro-magnetic poles which are differentially energized in accordance with the direction of the power flow of the circuit connected therewith and the voltage and current of said circuit.

In the drawings Figure 1 is a mid-sectional view through a relay structure embodying the present invention.

Figure 2 is an end view showing the relay-controlled contact.

Figure 3 is a diagrammatic view illustrating a desirable relationship between the movable and stationary poles and energizing windings.

Figures 4 and 5 are diagrammatic views illustrating modified arrangements of the energizing coils.

Figure 6 is a diagrammatic view illustrating a four-pole arrangement of electro-magnetic means of control.

Figure 7 is a diagrammatic view illustrating the electro-magnetic means forming part of the oscillatable armature.

Figure 5:
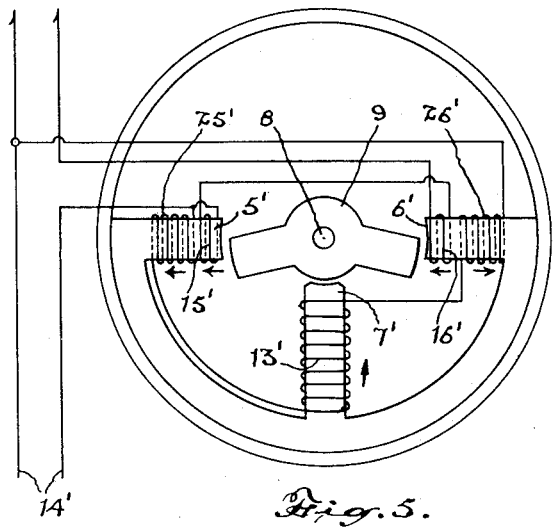

In the operation of electrically-controlled circuit breakers and other electrical operating equipment it is frequently desirable that provision be made in the form of a reverse power relay to protect such equipment against excessive current due in many cases to short circuits or other faults which may occur in the power-distributing system.

Numerous forms of relays have been devised in this connection but such have invariably been of a complicated and costly construction, sluggish in operation particularly on low voltage operation such as is usually experienced during a short circuit and the present invention has been devised to eliminate these difficulties and ensure positive and energetic response during critical periods in which the usual forms of relays would be likely to fail or be so slow in operation as to incur serious damage to equipment depending thereon for protection.

Referring to the form of construction illustrated in Figures 1 to 3, a casing is formed from a length of iron tubing 1 having a rear terminal-carrying closure plate 2 and a front closure plate 3 secured thereto.

A semi-circular yolk 4, which may be formed of laminated iron, is secured to the inner periphery of the tubular portion 1 and is here shown formed with poles 5 and 6 diametrically opposed and with an intermediate pole 7 of somewhat longer form.

A spindle 8 is oscillatably mounted at its ends in the end plates 2 and 3 axially of the tubular casing 1 and on this spindle is mounted an armature member 9 having a concentric hub portion 10, and poles 11 and 12, which are here shown diverging downwardly and adapted to be selectively brought into register with the fixed poles 5 and 6 respectively in accordance with the energizing of the poles.

The adjacent ends of the poles are concentrically surfaced to provide close co-operation without engagement, and the inner end of the pole 7 is concentrically surfaced to closely co-operate with the periphery of the hub portion 10 of the armature.

A magnet coil 13 or potential winding is here shown embracing the pole 7 and connected across a two-wire alternating current source of supply 14, while magnet coils or current windings 15 and 16 are here shown embracing the poles 5 and 6 respectively, and connected in series with the same alternating current circuit 14.

The polarity of the current flowing through coils 15 and 16 and the relation of these coils is such that the magnetic flux flows toward the armature in one of the poles and away from the armature in the other pole as indicated by the arrows in Figure 3.

When the relay coils are energized with polarity, as shown in Figure 3, and assuming the poles of the magnets 5, 6 and 7 being as indicated by the arrows, the magnetism or lines of force will be caused to flow into the armature from poles 6 and 7 and away from the armature through the pole 5, so that the latter pole will be the strongest or predominant one and will cause the armature to move in a clockwise direction until the end of the pole 11 on the armature substantially registers with the end of pole 5.

Assuming on the other hand that the current is reversed in the coils 15 and 16 of poles 5 and 6 with the polarity remaining unchanged in pole 7, then the magnetism or lines of force will be caused to flow into the armature from poles 5 and 7 and away from the armature through pole 6, thus making the latter pole the strongest or predominant one, so that the armature is caused to turn in a counter-clockwise direction, bringing the end of pole 12 into register with the end of pole 6.

The spindle 8 is here shown detachably mounting a block 17 on its projecting end 18 and an insulating strip 19 is secured thereto which carries a spring contact 20 and a supporting arm 21 therefor.

An adjustable contact 22 is mounted on and insulated from the end closure 3 and is adapted to be engaged by the contact 20' carried by the spring arm 20.

The armature and associated parts may be spring-biased for certain purposes to the contact-opening position by spring means 23, the tension of which may be accurately adjusted by the adjusting screw 24. Such spring means however may if desired, be eliminated and it will be seen that when the current is caused to flow in accordance with a selected polarity through the coils of poles 5, 6 and 7, the armature may be manipulated to be moved in either a clockwise or counter-clockwise direction to effect a positive opening or closing of the contacts 20' and 22, which are in turn adapted to open and close a circuit to be controlled.

The coil or winding 13, which is shown connected across the circuit 14, will vary in strength with the voltage of the said circuit. On the other hand, the coils 15 and 16, which are shown connected in series with the supply circuit, vary in strength with the current in the circuit and may be termed series coils.

The relay construction defined lends itself to a wide range of adaptability and in the modification shown in Figure 4 potential coils 25 and 26 replace the current coils 15 and 16 of Figure 3 on the poles 5' and 6', and these are connected in series with each other and across the current supply circuit 14'.

The pole 7' is provided with a current coil 27 in place of the potential coil 13 of Figure 3, and this coil is in series with the circuit 14'.

In the modification shown in Figure 5, current coils 15' and 16' are arranged on the poles 5' and 6' in association with potential coils 25' and 26', the latter coils being connected in series with a potential coil 13' on the pole 7' and across the circuit 14'. The coils 25', 26' and 13' create a magnetic flux which flows in pole 7' toward the armature and divides equally to flow outwardly in the poles 5' and 6' as indicated by the outermost arrows adjacent these poles.

The current coils 15' and 16' however will be energized in accordance with the direction of power flow so that additional fluxes will be induced in the poles 5' and 6' which will be either cumulative or in opposition to the aforesaid fluxes in the poles 5' and 6', resulting in positive instantaneous operation of the armature in either direction.

Referring to the modification shown in Figure 6, a four-pole arrangement is provided wherein current coils 15" and 16" embrace the stationary poles 5" and 6" and are energized from the current supply circuit 14' by a suitable current transformer 28, which transformer may, if desired, be employed in connection with the other forms of the device disclosed herein in place of directing the full current through the current coils.

The poles 29 and 30 each carry a potential coil as shown at 31 and 32, which coils are shown connected in series and having voltage impressed thereon from the line 14' through a suitable potential transformer 33.

In accordance with a further modification of the invention the current and potential coils may be mounted on pole extensions of the armature, and such an arrangement is illustrated in Figure 7, the armature being shown in this case provided with triple poles 34, 35 and 36 co-operating respectively with fixed shorter poles 34', 35' and 36'. The pole 35' may advantageously be of greater peripheral width than the pole 35 or the poles 34' and 36', and the latter are positioned in a horizontal plane slightly below the plane of disposition of the poles 34 and 36 to enhance the operation on the energizing of the coils.

Figure 8:
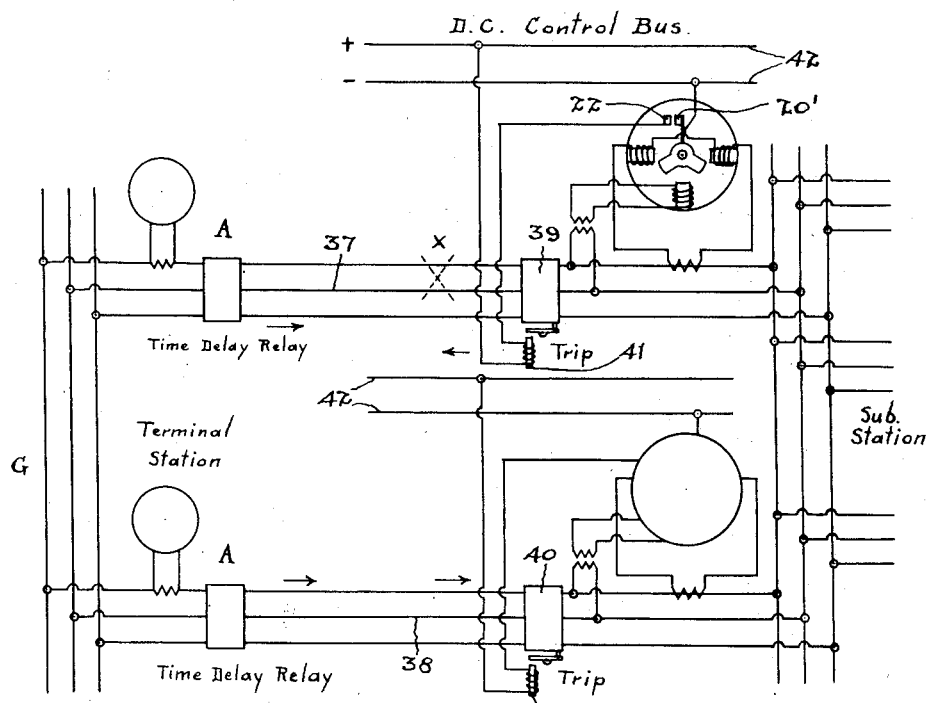
Figure 8 is a diagrammatic illustration of a typical power feeding and distributing system incorporating the present invention.

Although a relay of the type set forth herein is applicable to various purposes where relay control is required its principal field of usefulness lies in the field of electrical power distribution, and Figure 8 diagrammatically illustrates a typical electrical distributing system incorporating the present invention, and referring briefly to this illustration, a pair of parallel feeder circuits 37 and 38 are shown extending between a terminal station and sub-station and having main circuit breakers 39 and 40 therein respectively which are adapted to be tripped on energizing of a trip magnet, such as indicated at 41. The trip coil 41 is here shown energized from a D. C. control bus 42 subject to the closing of the relay contacts 22 and 20'.

Normally current is fed in parallel through the feeder circuits 37 and 38 but should a fault or short circuit develop, for instance, at the point marked X in circuit 37, there would be a reversal of the current flow or an interruption which will cause operation of the relay associated with this faulty circuit, closing a circuit through the trip coil 41 and thereby tripping out the main breaker 39, so that the good feeder 38 may continue to carry the load. A time limit overcurrent relay A is so arranged in the circuits 37 and 38 that upon a short occuring such relay will operate to cut out the circuit shorted and isolate the fault X from the generator end G. In this way damage will be reduced to the minimum by reason of the sensitive and instantaneous operation of the relay associated with the faulty circuit, and the defective circuit will be tripped out so quickly that damage will be prevented or greatly minimized and the breaker 40 in the feeder circuit 38 will be prevented from tripping out.

In either of the forms of the invention illustrated the potential coils will preferably be wound of a considerably greater length of wire than the current-carrying coils and of a finer character and they may be energized either directly from a main circuit or through the inter-position of a suitable transformer or transformers.

While we have shown preferred embodiments of the present invention we are aware that further modifications may be resorted to without departing from the spirit thereof, and while the energizing circuit for the relay has been defined as carrying alternating current, the relay defined herein is capable of operation with equal facility in connection with a circuit carrying direct current.

What we claim as our invention is:

1. A reverse power relay having in combination an armature having a concentric hub portion and radial pole extensions therebeyond angularly offset the one relative to the other, electro-magnetic means including a fixed long pole co-operating directly with the concentric hub portion of the armature and radially disposed shorter poles spaced therefrom circumferentially and co-operating with the pole extensions of the armature to selectively align the same radially therewith, said electro-magnetic means adapted to be differentially energized to swing the armature in either a clockwise or counter-clockwise direction, and contact opening and closing means co-operating with said armature.

2. A reverse power relay for co-operation with an A. C. circuit, comprising an oscillatable armature having a plurality of poles radiating from a concentric hub portion and spaced peripherally, a magnetic yoke member having a triple set of circumferentially spaced magnetizable poles at least two of which are disposed in magnetically co-operative relation with said armature poles, the relative angular disposition of said co-operative armature poles and yoke poles being such that when one armature pole is in register with its respective yoke pole the other armature pole or poles will be just slightly offset from the other yoke pole or poles, electro-magnetic means co-operating with all of said poles and energized by the A. C. flow in said circuit to create a magnetic flux passing into one of the armature poles and simultaneously out of the other dependent on the direction of flow of power in said circuit, and electro-magnetic means magnetically co-operating directly with said concentric hub portion of the armature and differentially energized from said A. C. circuit to direct a magnetic flux through one of said armature poles dependent on the direction of the magnetic flux created by the aforesaid electro-magnetic means.

3. Means as claimed in claim 2 in which said first-mentioned electro-magnetic means includes current coils connected in series with said power circuit and mounted on said two yoke poles, and the last-mentioned electro-magnetic means comprises a potential winding connected across said power circuit, the other of said triple fixed poles being longer than said two yoke poles and uniformly angularly related thereto.

4. Means as claimed in claim 2 in which said first-mentioned electro-magnetic means includes potential coils connected in series across said power circuit and mounted on said two yoke poles, and the last-mentioned electro-magnetic means comprises a current winding connected in series with said circuit and mounted on the other remaining yoke pole of the triple set.

5. The combination with an energizing circuit, of a reverse power relay having an armature formed with pole projections and having fixed magnetic poles co-operative therewith, and electro-magnetic means co-operating with said fixed poles and differentially connected with said energizing circuit in regard to the potential and current values thereof, said fixed poles including opposed poles and an intermediate pole and said electro-magnetic means including a potential winding on each of said fixed poles all connected in series and across said circuit, and current coils mounted on said opposed poles and connected in series with each other and with said circuit.

EDWARD M. ASHWORTH.
FRANK F. AMBUHL.